United States Patent [19]

Bagby

[11] Patent Number: 4,556,280

[45] Date of Patent: Dec. 3, 1985

[54] SINGLE CABLE OPTICAL FIBRE SIGNALING SYSTEM

[75] Inventor: Robert J. Bagby, Evanston, Ill.

[73] Assignee: United States Riley Corporation, Skokie, Ill.

[21] Appl. No.: 531,933

[22] Filed: Sep. 13, 1983

[51] Int. Cl.⁴ .............................................. G02B 5/14
[52] U.S. Cl. ................... 350/96.16; 250/227; 340/870.28; 350/96.20
[58] Field of Search ............... 350/96.15, 96.16, 96.20; 340/870.28, 555, 556; 455/610, 612; 250/227

[56] References Cited

U.S. PATENT DOCUMENTS

| | | | |
|---|---|---|---|
| 4,170,731 | 10/1979 | Howell et al. | 250/227 |
| 4,195,269 | 3/1980 | Ettenberg et al. | 455/612 X |
| 4,249,794 | 2/1981 | Haley | 350/96.20 |
| 4,262,362 | 4/1981 | Kiernan et al. | 455/612 |
| 4,376,566 | 3/1983 | Blackington | 350/96.20 |
| 4,437,728 | 3/1984 | Ohashi | 350/96.20 |

Primary Examiner—John Lee
Attorney, Agent, or Firm—Mason, Kolehmainen, Rathburn & Wyss

[57] ABSTRACT

A single optical fibre cable signaling system is provided between a central station and a remote location wherein a shutter element is movable between first and second positions at the remote location in response to a change in the measured variable. The shutter element and the interior of a housing surrounding the end of the cable have cooperating light reflecting and light absorbing surfaces which are effective in one position in the shutter element to absorb unmodulated light transmitted from a source of the central station over the cable to the remote location and prevent the same from being transmitted back over the cable and are effective in the other position of the shutter element to reflect unmodulated light transmitted to the remote location back over the cable to the central station.

20 Claims, 8 Drawing Figures

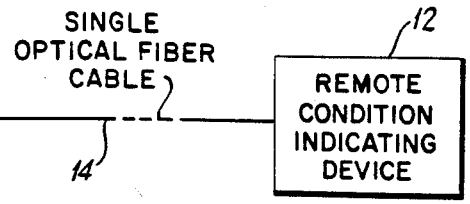
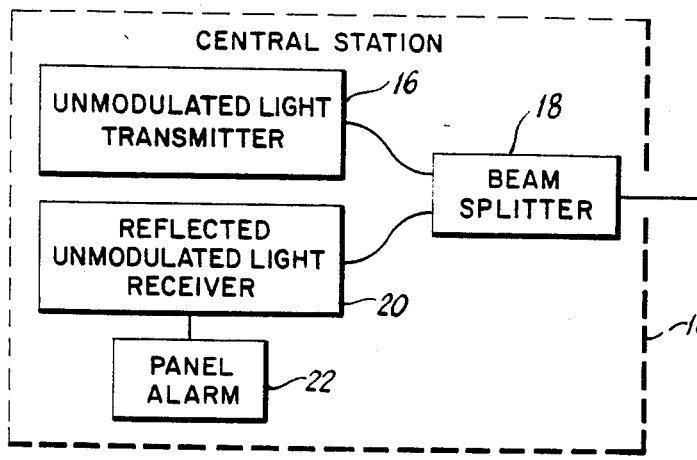
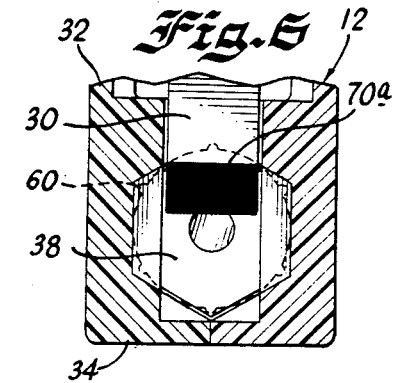
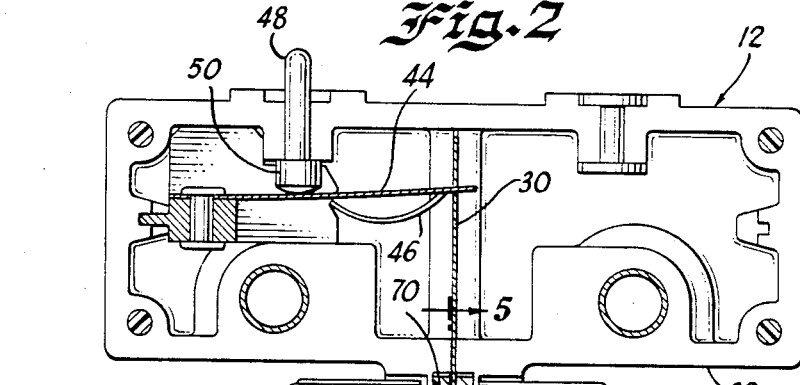
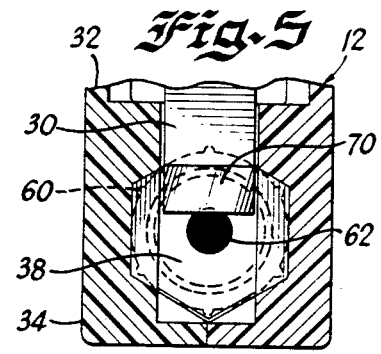
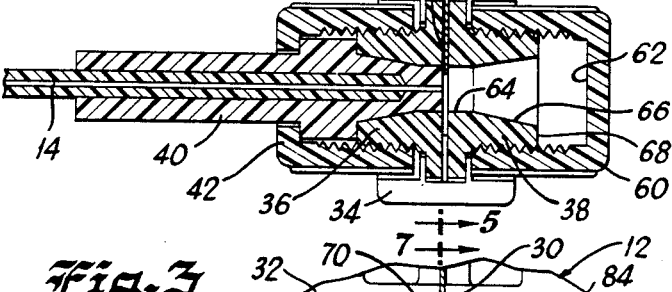
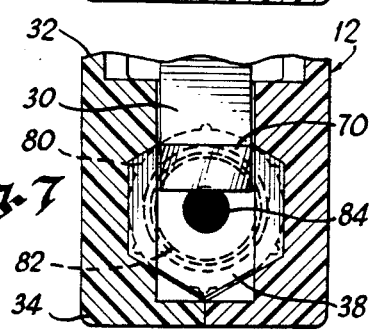
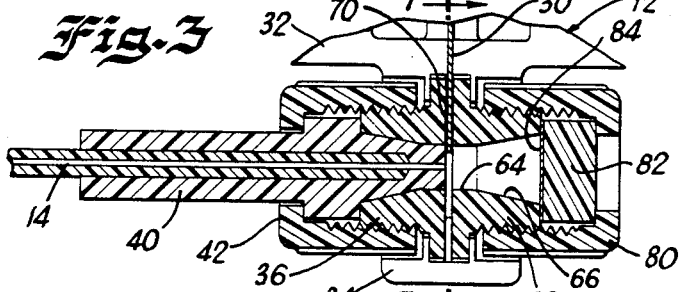
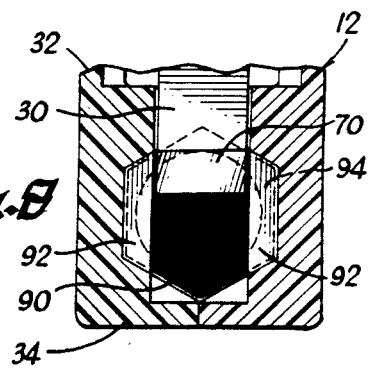
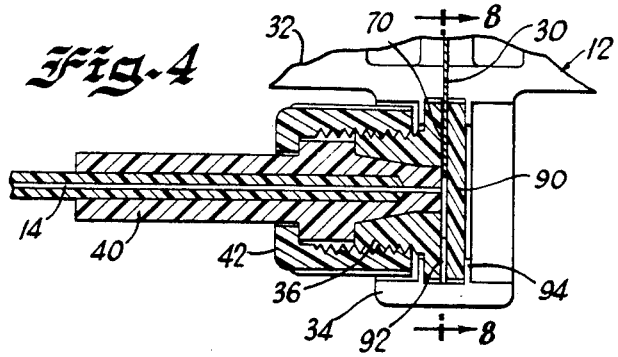

SINGLE CABLE OPTICAL FIBRE SIGNALING SYSTEM

The present invention relates to optical fibre signaling systems and, more particularly, to optical fibre signaling systems which are employed to transmit a change in condition from a remote point to a central location.

In many instances it is desirable to transmit a change in condition over a long distance. For example, when a switch is closed at some remote location in reference to a change in a measured variable at that location, it is desirable to transmit a signal representing such switch closure to a central station where the switch closure signal may actuate an annunicator on a common indicator or control panel.

With the advent of the use of fibre optic cables in various types of communication systems, it has been proposed to substitute a shutter element for the switch contacts, the shutter element being movable between the coaxially arranged ends of a pair of fibre optic cables in response to a change in the measured variable at the remote location. The shutter element interrupts a beam of light which is normally transmitted from a light source at the central station over the first cable to the remote location and over the second cable back to a light detector also located at the central station. Such arrangements are shown, for example, in my copending application Ser. No. 422,076, filed Sept. 23, 1982, (now abandoned) some of the patents mentioned in that application, Narodny Pat. No. 3,586,544, Hudson Pat. No. 3,883,223, Lewis Pat. No. 4,057,719 and Tomlinson III et al Pat. No. 4,208,094. In addition, other prior art arrangements have physically moved the end of one fibre optic cable out of alignment with the other cable to interrupt the light beam, as shown for example in Brocker Pat. No. 3,976,876, Johnson et al Pat. No. 4,204,742, Albanese Pat. No. 4,152,043, Terai et al Pat. No. 4,189,206, Hara Pat. No. 4,193,662, Wittmann Pat. No. 4,204,744, Antell Pat. No. 4,220,396, Kammer et al Pat. No. 4,223,978, Hodge et al Pat. No. 4,229,068, and Leone et al Pat. No. 3,581,003.

In those instances where the light beam is interrupted at a location remote from the light source and light detector, these prior art arrangements have uniformly required two separate fibre optic cables between the central station and the remote location, in a manner analogous to electrical switches which require two wires between the central station and each remote station. However, in many instances process variables or the like may be measured at remote locations as far as a mile or more from the central station. In those situations the cost of two fibre optic cables to each remote location may be excessive and render the fibre optic cable switching system prohibitively expensive as compared to an electrical wire switching system. In addition, fibre optic cables cannot be bent as sharply as wires and some fibre optic cables require a bending radius of up to two inches. Accordingly, when two cables are required to each remote location a bulky, unwieldy structure is required at the remote station.

In addition to the above described fibre optic switching systems, certain other arrangements have employed a single fibre optic cable in a two way optical communication system. In such arrangements modulated light sources are provided at each end of the single fibre optic cable and transmit modulated light beams in both directions over the cable to optical receivers located at the other ends of the cable. In these two way communication systems the optical transmitter (modulated light source) and optical receiver (or detector) for each of the bidirectional paths are located at opposite ends of the fiber optic cable and the optical transmitters are operated at different optical wavelengths to maintain separation between channels. Examples of such two-way communication systems are shown in Ettenberg U.S. Pat. No. 4,195,269, Kiernan et al U.S. Pat. No. 4,262,362 and Miller et al Pat. No. 4,292,512. In the Ettenberg patent, information is introduced into one end of the cable by modulating a reflective element at the far end of the cable which reflects back some of the modulated light energy to a laser diode transmitter at the near end of the cable which laser diode also acts as a receiver for the reflected radiation. The reflector element is modulated at a much lower rate than the frequency of the modulated radiation emitted by the laser diode. In Maslowski et al Pat. No. 4,070,118 a fault in a fibre optic cable is located by feeding light pulses from a laser into one end of the cable and detecting the location of the fault from the propogation time of the reflected pulses.

It is an object, therefore, of the present invention, to provide a new and improved optical fibre signaling system which avoids one or more of the above-discussed disadvantages of prior art arrangements.

It is another object of the present invention to provide a new and improved optical fibre signaling system wherein a single optical fibre cable is employed to transmit a change in the measured variable at a remote location to a common central station.

Briefly, the above and further objects of the present invention are accomplished by providing a source of unmodulated light at the central station together with bidirectional coupling means connected between the light source and a single optical fibre cable at the central station. A shutter element at the remote location is movable between first and second positions in response to a change in the measured variable, the other end of the single optical fibre cable being terminated within a housing in cooperating relation to the movable shutter element, said shutter element and the interior of the housing having cooperating light reflecting and light absorbing surfaces which are effective in one position of the shutter element to absorb unmodulated light transmitted from the source over said cable to said remote location and prevent the same from being transmitted back over said cable to said bidirectional coupling means and effective in the other position of said shutter element to reflect unmodulated light transmitted to said remote location back over the cable to the bidirectional coupling means. An annunciator or other alarm system is coupled to the bidirectional coupling means at the central station and is responsive to reflected unmodulated light transmitted back over the single cable when the shutter element is in said other position for developing a suitable indication or alarm signal.

The invention both as to its organization and method of operation, together with further objects and advantages thereof, will best be understood by reference to the following specification taken in connection with the accompanying drawings, in which:

FIG. 1 is a block diagram of the single cable optical fibre signaling system of the present invention;

FIG. 2 is a sectional view of one embodiment of the remote condition indicating device employed in the system of FIG. 1;

FIG. 3 is an alternative embodiment of a remote condition indicating device which may be employed in the system of FIG. 1;

FIG. 4 is a sectional view of a further alternative embodiment of the present invention which may be used in the system of FIG. 1;

FIG. 5 is a sectional view taken along the line 5—5 of FIG. 2;

FIG. 6 is a sectional view similar to FIG. 5 but showing the light reflective and absorptive surfaces reversed;

FIG. 7 is a sectional view taken along the line 7—7 of FIG. 3; and

FIG. 8 is a sectional view taken along the line 8—8 of FIG. 4.

Referring now to the drawings and more particularly to FIG. 1 thereof, the present invention is therein illustrated in connection with an annunciator system in which signals from a plurality of remote locations are supplied to a central station indicated generally at 10, one of these remote stations being indicated by a remote condition indicating device 12, the central station 10 being connected to each remote device 12 by means of a single optical fibre cable 14. At the central station 10 an unmodulated light transmitter 16 is employed as an unmodulated light source the output of which is supplied to the single optical fibre cable 14 through a beam splitter or bidirectional coupling means 18. Light from the transmitter 16 which is transmitted over the cable 14 to the remote indicating device 12 at a remote location is reflected back over the same cable 14 by means of a light reflecting shutter which is movably positioned in relation to the remote end of the cable 14 in accordance with the occurrence of a predetermined condition or event. In particular, a movable shutter arrangement such as shown in my copending application Ser. No. 422,076, filed Sept. 23, 1982 is modified to provide such a device, as will be described in more detail hereinafter.

The unmodulated light which is reflected back over the cable 14 by interposing a light reflective surface adjacent the remote end of the cable 14, is transmitted through the beam splitter 18 to a reflected unmodulated light receiver 20 where it is detected and converted to a suitable electrical signal which is employed to actuate a panel alarm 22 on the main control panel of the central station 10, the panel alarm 22 providing a suitable audible or visual alarm signal, as will be readily apparent to those skilled in the art.

In my copending application Ser. No. 422,076 an arrangement is disclosed for interposing a movable shutter between the opposed end faces of a pair of optical fibre cables. In response to the occurrence of a desired event or condition, the shutter is moved between these end faces to interrupt the flow of light between the two cables, such light interruption being indicative of the occurrence of the desired condition of event. In the present invention, a movable shutter arrangement is employed which is similar to that disclosed in my copending application Ser. No. 422,076 but which is modified so that one of the two optical fibre cables may be eliminated. More particularly, referring to FIG. 2 of the drawings, a movable shutter 30 is slideably mounted for vertical movement within a housing 32 and extends downwardly into an offset central portion 34 within which are mounted a pair of optical fibre cable bushings 36 and 38. Preferably, the bushings 36, 38 are mounted within the offset portion 36 by means of the alignment procedure described in my copending application Ser. No. 422,076 so that the shutter 30 is exactly perpendicular to the central axis of the two bushings 36, 38. The single optical fibre cable 14 of FIG. 1 is terminated in the optical fibre terminating ferrule 40 which is received within the bushing 36 and is secured therewithin by means of the end cap 42.

Movement of the shutter 30 is controlled by means of an actuating member 44 one end of which is rigidly mounted in the housing 32 and the other end of which extends through a slot in the shutter 30. The actuating member 44 is held in an uppermost position by means of a pair of bowed spring arms 46 and an actuator pin 48 is mounted in the top wall of the housing 32 and includes a head portion 50 in engagement with the actuating member 44. When a downward force is exerted on the actuator pin 48 in response to the occurrence of a predetermined event or condition, the actuator member 44 is moved downwardly beyond the pivot point of the spring arms 46 so that the shutter 30 is rapidly moved downwardly with a snap action to a position in which the bottom end of the shutter 30 is moved in front of the exposed end face of the fibre optic cable 14.

In accordance with the present invention, no optical fibre cable is mounted in the bushing 38 and a solid end cap 60 is threaded onto the end of the bushing 38 in place of the standard end cap 42. The inner surfaces 62 of the end cap 60 are painted black or otherwise rendered light absorptive to prevent the reflection of light from these surfaces. In addition, the inner surfaces 64, 66 and the end face 68 of the bushing 38 are covered with black paint or other light absorptive material to prevent the reflection of light from these surfaces. Accordingly, when the shutter 30 is in the uppermost position shown in FIG. 2 the unmodulated light which is supplied from the transmitter 16 through the beam splitter 18 to the cable 14 is absorbed by the light absorbing surfaces 62, 64, 66 and 68 provided in the remote condition indicating device 12 shown in FIG. 2 so that no light is reflected back through the beam splitter 18 to the receiver 20. However, when the actuator 44 moves the shutter 30 downwardly with a snap action, a mirrored surface 70 which is provided on the side of the shutter 30 adjacent the end face of the cable 14, is moved into light reflecting relationship to this end face so that unmodulated light is reflected back over the single cable 14 and through the beam splitter 18 to the light receiver 20. The reflective surface 70 is preferably formed by vacuum metalizing an area of the shutter 30 adjacent the end of the cable 14 to provide a silvered surface which is highly light reflective for the type of light emitted by the transmitter 16.

The transmitter 16 projects an extremely narrow beam in order to concentrate most of the available light for transmission along the single cable 14. Preferably the transmitter 16 is an LED light source which emits light in the near infrared range and is provided with a bead type lens to concentrate light emitted therefrom. The LED is mounted in a threaded bushing which may be connected directly to one input of the beam splitter 18. The light receiver 20 is preferably a phototransistor which responds primarily to light in the near infrared range emitted by the transmitter 16.

It should be noted that both the light transmitted from the transmitter 16 over the cable 14 to the remote device 12 and the light reflected back from the surface 70 over the cable 14 to the beam splitter 18 and the receiver 20 are both unmodulated and are of the same frequency. While it might appear impossible to transmit unmodulated light beams of the same frequency in opposite directions through the cable, it should be understood that the light transmitter 16 provides an extremely narrow beam of light which is transmitted along the cable 14. It has been found that while the returning light waves interfere with the transmitted light waves at their many points of juncture along the cable 14, this interference produces temporary amplitude changes but does not produce attenuation changes. The transmission of light beams in both directions through the cable 14 may be analogized to the situation where the headlights of two cars approaching along a highway intersect. The intersection produces an area of increased light intensity but does not cause attenuation of each headlight beam. Accordingly, the transmitted beam may be reflected by the surface 70 back along the cable 14 and through the beam splitter 18 to the light receiver 20 with an attenuation dependent only on the normal attenuation of light being transmitted through the cable 14. Preferably, the beam splitter 18 has a high efficiency so that substantially all of the light developed by the light transmitter 16 is supplied to the input end of the cable 14 and very little is coupled to the input of the receiver 20. Similarly, substantially all of the reflected light which is reflected back over the cable 14 from the remote location 12 is supplied to the light receiver 20 and very little light is coupled into the light transmitter 16. While the beam splitter 18 may be of any suitable construction, a one-way mirror type of beam splitter such as shown, for example, in Kiernan et al U.S. Pat. No. 4,262,362 is preferably employed.

While it is prefered to provide the light reflective surface 70 on the shutter 30 and to provide the light absorbing surfaces 62–68, it is also possible to provide, in accordance with the present invention, an arrangement in which the shutter 30 is provided with a blackened, light absorptive surface 70A adjacent the side thereof which is positioned over the end face of the cable 14, as shown in FIG. 6, and to coat the surfaces 62, 64, 66 and 68 with a material which is highly light reflective. In such an arrangement, the light transmitted over the cable 14 from the transmitter 16 is reflected back over the cable 14 and through the beam splitter 18 to the receiver 20 when the shutter 30 is in the uppermost position shown in FIG. 2. However, when the actuator pin is depressed and the shutter 30 is moved downwardly over the end of the cable 14 the transmitted light is totally absorbed by the black surface 70a of the shutter 30 and no light is reflected back over the cable. Such an arrangement is somewhat less efficient than providing a reflective surface 70 on the shutter 30 because the surfaces 62, 64, 66 and 68 cannot be made as optically efficient as the surface 70 in reflecting light back into the end of the cable 14.

In FIG. 3 an alternative embodiment of the invention is shown which differs from that of FIG. 2 in that a standard end cap 80 is employed to hold an insert 82 against the end face of the bushing 38. The internal surfaces 64, 66 of the bushing 38 are coated with black paint, or other light absorbing material, as in the embodiment of FIG. 2, and the insert 82 is provided with a light absorptive surface 84 adjacent the end of the bushing 38 so as to totally absorb light transmitted over the cable 14 when the shutter 30 is in the uppermost position shown in FIG. 3. When the shutter 30 is moved downwardly in response to a predetermined condition or event, the light reflective surface 70 is moved downwardly over the end face of the cable 14 and reflects light back over the cable 14 and through the beam splitter 18 to the receiver 20 in a manner identical to that described in detail heretofore in connection with FIG. 2. In this connection it will also be understood that in the embodiment of FIG. 3 the light reflective and light absorptive surfaces may be reversed, i.e. the surfaces 64, 66 and 84 may be coated with a material which is highly light reflective and the shutter 30 may be coated with a light absorptive coating instead of the reflective surface 70.

In FIG. 4 a further alternative embodiment of the present invention is illustrated wherein the bushing 38 of FIGS. 2 and 3 is eliminated and a hexagonally shaped plate 90 which is of the same thickness and shape as the flanged portion of the bushing 38, is mounted in the offset portion 34. As described in detail in my copending application Ser. No. 422,076, the offset portion 34 is provided with the inwardly extending rib portions 92 and 94 within which the plate 90 may be conveniently mounted and secured. In the embodiment of FIG. 4 the shutter 30 is again provided with the light reflective surface 70, as described in the other embodiments of the invention and the plate 90 is provided with a light absorptive surface on the side adjacent to and opposite the end face of the optical fibre cable 14. Accordingly, when the shutter 30 is in the uppermost position shown in FIG. 4 the light transmitted over the cable 14 from the central station 10 is totally absorbed in this light absorptive surface of the plate 90. However, when the shutter 30 is moved downwardly to position the light reflective surface 70 opposite the end face of the cable 14 a large portion of the light is reflected back over the cable 14 and through the beam splitter 18 to the receiver 20, in the manner described in detail heretofore.

In the embodiment of FIG. 4 the light reflective and light absorptive surfaces may again be reversed, in which case the plate 90 will be provided with a light reflective surface in the area opposite to and adjacent the end face of the cable 14 and the shutter 30 is coated with a light absorptive material so that when this shutter is moved to its downward position over the end of the cable 14 all transmitted light will be absorbed.

If it is desired to reverse the action of any of the above described embodiments, it should be understood that the shutter 30 may be somewhat longer so that it extends over the end face of the cable 14 when it is in its uppermost position and a hole may be provided in this shutter which is moved into alignment with the end face of the cable when the pin 48 is actuated and this shutter is moved downwardly.

While there has been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. An annunciator system for developing an indication at an annunciator station in response to a control signal produced at a remote location comprising, a single optical fibre cable interconnecting said annunciator station and said remote location, a source of unmodulated light at said annunciator station, bidirectional coupling means connected between said light source and one end of said cable at said annunciator station, a shutter element at said remote location and movable between first and second positions in response to said control signal, means for terminating the other end of said cable in cooperating relation to said movable shutter element, means effective in one position of said shutter element to absorb unmodulated light transmitted from said source over said cable to said remote location and prevent the same from being transmitted back over said cable to said bidirectional coupling means, means effective in the other position of said shutter element to reflect unmodulated light transmitted to said remote location back over said cable to said bidirectional coupling means, and annunciator means connected to said bidirectional coupling means at said annunciator station and responsive to reflected unmodulated light transmitted back over said cable when said shutter element is in said other position for developing an annunciator control signal.

2. An optical fibre signaling system for providing a control signal at a central station in response to a change in condition at a remote location, comprising a single optical fibre cable interconnecting said central station and said remote location, a source of unmodulated light at said central station, bidirectional coupling means connected between said light source and said cable at said central station, light reflective means coupled to said cable at said remote location and including an element movable from a first position to a second position in response to a change in condition at said remote location, said light reflective means being effective in one of said positions of said element to reflect unmodulated light which is transmitted from said source over said cable to said remote location back over said cable to said bidirectional coupling means and effective in the other of said positions of said element to prevent light transmitted from said source over said cable to said remote location from being transmitted back over said cable to said bidirectional coupling means, and means connected to said bidirectional coupling means at said central station and responsive to reflected light transmitted over said cable from said remote location when said element is in said one position for developing a control signal.

3. The optical fibre signaling system of claim 2, wherein the end of said cable at said remote location is positioned in a housing and said movable element is mounted in said housing adjacent said end of said cable for movement in a direction perpendicular to the longitudinal axis of said cable.

4. The optical fibre signaling system of claim 3 wherein the portion of said element which is adjacent said end of said cable when said element is in said one position is highly reflective and the interior of said housing is highly light absorptive when said element is in said other position.

5. The optical fibre signaling system of claim 2, which includes a support for the end of said cable at said remote location, and said element comprises a shutter blade mounted on said support for movement in a direction transverse to the longitudinal axis of said cable between a position in which said shutter blade covers the end of said cable and a position in which the end of said cable is not covered by said shutter blade.

6. The signaling system of claim 5, which includes a blade actuating member extending generally perpendicular to said shutter blade and having an end portion connected thereto.

7. The signaling system of claim 6, wherein said blade actuating member is a thin flexible member one end of which is positioned in said support and the other end of which extends through a slot in said shutter blade.

8. The signaling system of claim 7, which includes an actuator pin movably mounted in said support and having a portion in engagement with said actuating member at a point intermediate the ends thereof.

9. The signaling system of claim 5, which includes means defining a slot in said support extending parallel to the end face of said end of said cable, said shutter blade being movably mounted within said slot so that one side thereof is closely adjacent said end face of said cable.

10. The signaling system of claim 9, wherein the portion of said shutter blade which covers said end face of said cable is light absorptive, thereby to prevent light transmitted from said source over said cable to said remote location from being transmitted back over said cable to said bidirectional coupling means.

11. The signaling system of claim 9, which includes means operative when said shutter blade is not covering said end face of said cable for reflecting light which is emitted from said end face back into said end face for transmission back over said cable to said bidirectional coupling means.

12. The signaling system of claim 11, wherein said light reflecting means comprises a light reflective surface extending in a plane parallel to said end face and positioned opposite said end face beyond said shutter blade.

13. The signaling system of claim 2, which includes a support at said remote location, a fibre optic cable bushing mounted on said support and having a central bore within which is positioned a fibre optic cable terminating ferrule connected to the end of said cable, and a shutter blade mounted in said support for movement between a position in which said shutter blade is closely adjacent to and covers the end face of said cable and a position in which said shutter blade is offset from the end face of said cable.

14. The signaling system of claim 13, which includes another fibre optic cable bushing mounted in said support on the other side of said shutter blade, and light reflective means associated with said other bushing and operative when said shutter blade is offset from the end face of said cable for reflecting light back into said end face of said cable for transmission back over said cable to said bidirectional coupling means.

15. The signaling system of claim 14, wherein said light reflective means comprises a light reflective element positioned on the end of said other bushing and held thereon by a cap member threaded onto the end of said other bushing.

16. The signaling system of claim 14, wherein said light reflective means comprises a cap member secured to the end of said other bushing, said cap member having an internal light reflective surface for reflecting light back into said end face of said cable when said shutter blade is offset from said end face.

17. The signaling system of claim 13, wherein the portion of said shutter blade which covers said end face of said cable is light absorptive.

18. The signaling system of claim 13, wherein the portion of said shutter blade which covers said end face of said cable is light reflective.

19. The signaling system of claim 18, which includes light absorptive means behind said shutter blade and adapted to absorb light emitted from said end face when said shutter blade is in said offset position.

20. The signaling system of claim 18, which includes means positioned behind said shutter blade and effective when said blade is in said offset position to prevent light transmitted out of said end face from being reflected back into said end face.

* * * * *